United States Patent [19]

Miyake

[11] 4,324,837

[45] Apr. 13, 1982

[54] SELF-BONDING MAGNET WIRE

[75] Inventor: Masayoshi Miyake, Nagoya, Japan

[73] Assignee: Sumitomo Electric Industries, Ltd., Osaka, Japan

[21] Appl. No.: 163,458

[22] Filed: Jun. 27, 1980

[30] Foreign Application Priority Data

Jun. 27, 1979 [JP] Japan .................................. 54-81952

[51] Int. Cl.³ ...................... B32B 15/00; B32B 27/00; H01B 7/00
[52] U.S. Cl. .............................. 428/375; 174/120 SR; 428/383
[58] Field of Search ....................... 428/379, 383, 375; 174/110 SR, 110 F, 120 SR; 528/76, 65, 44, 45; 427/118, 120

[56] References Cited

U.S. PATENT DOCUMENTS

| 2,871,226 | 1/1959 | McShane | 528/65 |
| 2,929,800 | 3/1960 | Hill, Jr. | 528/65 X |
| 3,105,775 | 10/1963 | Lavin et al. | 427/120 |
| 3,207,626 | 9/1965 | Lavin et al. | 428/383 |
| 3,300,843 | 1/1967 | Umewaka | 427/118 X |
| 3,361,593 | 1/1968 | Sattler et al. | 428/383 |
| 3,393,177 | 7/1968 | Guest et al. | 528/45 |

FOREIGN PATENT DOCUMENTS 1195886 6/1970 United Kingdom .................. 260/45

*Primary Examiner*—Lorraine T. Kendell
*Attorney, Agent, or Firm*—Sughrue, Mion, Zinn, Macpeak and Seas

[57] ABSTRACT

A self-bonding magnet wire produced by coating an insulated conductor with an enamel composition consisting essentially of a thermoplastic linear polyurethane prepared by reacting a glycolic component comprising polyoxyalkylene glycol or polyoxyalkylene glycol and alkylene glycol with an aromatic diisocyanate and baking the coated conductor.

22 Claims, No Drawings

SELF-BONDING MAGNET WIRE

BACKGROUND OF THE INVENTION

1. Field of the Invention

This invention relates to a novel self-bonding magnet wire, and more particularly, to a self-bonding magnet wire having high refrigerant resistance and exhibiting high bond strength at high temperatures.

2. Description of the Prior Art

A recent trend in the manufacture of electric appliances is to omit or simplify the varnish impregnating step by using a "self-bonding magnet wire" which comprises an insulated conductor having an outer coating of a heat-bonding layer. The heat-bonding layer is conventionally made of a poly(vinyl butyral)resin, co-polyamide resin, phenoxy resin or polysulfone resin. Common applications of such self-bonding magnet wire include use in deflecting yoke coils for television sets, in voice coils for speakers or microphones, as well as in various transformers and motors. And the demand for the self-bonding magnet wire in hermetic motors and other applications which require refrigerant- and heat-resistance is increasing.

However, self bonding magnet wire using known bonding materials is poor in resistance to refrigerant and/or heat, and hence, is not very suitable for use in hermetic motors and other applications which require refrigerant- and heat-resistance electric wires. Heat-bonding layers composed of poly(vinyl butyral)resin, copolyamide resin or phenoxy resin are low in both heat resistance and refrigerant resistance, whereas those made of the heat-resistant polysulfone resin are not satisfactory in refrigerant resistance. The self-bonding layer of the conventional self-bonding magnet wire using these materials is dissolved out in a refrigerant such as Freon ® R-12 or Freon ® R-22 (trademark) and fails to achieve the desired bonding function. Furthermore, an insoluble ingredient extracted with a refrigerant can clog the opening of the compressor valve or a refrigerant expansion valve in a refrigerator, to reduce the refrigerating capacity of the refrigerator. In addition, if the motor is started in spite of voltage drop or abnormal operation (e.g., when the compressor is started immediately after its shutdown) involving a locked rotor, an overload on the stator causes a rapid increase in the temperature of the coil, and an electric wire using the conventional bonding material discolors or blisters and its electrical characteristics are reduced to such an extent that layer shorting, i.e., short-circuiting between magnet wires, occurs. Under normal operation, the motor is run in the refrigerant at from 80° to 100° C., but a self-bonding layer made of the conventional bonding material becomes low in bond strength if it is immersed in the refrigerant, and as a result, the coil may be deformed.

SUMMARY OF THE INVENTION

As a result of extensive efforts to eliminate these defects of the conventional art, a self-bonding magnet wire has now been developed that can be used in applications that require high refrigerant resistance. More particularly, it has been found that a thermoplastic linear polyurethane resin of a specific composition has a high resistance to refrigerant and heat that has been unobtainable with the conventional bonding material.

The self-bonding magnet wire of this invention is produced by coating an insulated conductor with an enamel composition consisting essentially of a thermoplastic linear polyurethane prepared from a glycolic component comprising polyoxyalkylene glycol, or polyoxyalkylene glycol and alkylene glycol, and an aromatic diisocyanate, and then baking the thus coated conductor.

DETAILED DESCRIPTION OF THE INVENTION

The bonding material making up the bonding layer of the self-bonding magnet wire of this invention is high in resistance to heat and refrigerant, and hence it keeps working effectively without being attacked by refrigerants, such as Freon ® R-12 or Freon ® R-22 (trademark). Since only a very small amount of the bonding material is extracted with the refrigerant and even such extracted component is soluble in the refrigerant, it will not clog the opening of a compressor valve or a refrigerant expansion valve, and thereby prevents any reduction of the refrigerating capacity of the refrigerator. As a further advantage, the coating of the self-bonding magnet wire of this invention neither discolors nor blisters even if there is a sudden increase in the temperature of the motor under an overload condition in the refrigerant. This prevents layer shorting due to a reduction in the electrical insulating characteristics of the wire. Additionally, the bonding layer in the refrigerant retains its original high bond strength at high temperatures (e.g. 100° C.), and hence, high-temperature deformation of the coil is prevented.

A conventional impregnant varnish (e.g., Pedigree-923 of P. D. George, U.S.A., known as a varnish for impregnating an electric wire for use in a refrigerator) is heat-cured at about 140°–160° C. before use. In the state of the art, the varnished wire is heat-cured with an oven that supplies a temperature no higher than about 180° C. Therefore, no matter how resistant such a conventional self-bonding layer is against heat and refrigerant, if it requires a high temperature (e.g. 180°–220° C.) to be heat-bonded to an insulated electric wire, the insulation coating may be affected adversely by being exposed to an atmosphere of high temperature. In addition, a conventional drying oven that cannot provide the desired heat must be supplemented by another oven, or retrofitted to generate more heat, but either method adds to the equipment cost. These problems can be solved by using a self-bonding magnet wire of this invention.

The self-bonding magnet of this invention is not only high in resistance to refrigerant and heat; it can also be heat-bonded at a temperature of from only 140° to 180° C., and hence the conventional drying oven for heat-curing impregnant varnish can be used as is. Furthermore, the self-bonding magnet wire of this invention can be bonded without having any adverse effect on the insulation coating, as in the application of a conventional impregnant varnish.

The enamel consisting essentially of the thermoplastic linear polyurethane according to this invention is a polymer solution of the thermoplastic linear polyurethane. It may also contain at least one compound selected from another thermoplastic resin, thermosetting resin, filler, pigment, dye, silicone compound or a fluorine-containing compound provided that such additive is not deleterious to the desired characteristics of the self-bonding magnet wire.

The self-bonding magnet wire of this invention is produced by coating an insulated conductor with the enamel consisting essentially of the thermoplastic linear polyurethane and baking the enamel. There is no particular limitation on the insulator on which the coating of the enamel can be formed, but for the purposes of this invention, it is desirably selected from those insulators which are conventionally used in a hermetic motor, such as polyamideimide, poly(vinyl formal), polyesterimide overcoated with polyamideimide, polyamideimide overcoated with polyesterimide, polyimide overcoated with poly(vinyl formal), and polyesteramideimide. Polyamideimide and polyesterimide overcoated with polyamideimide are particularly preferred.

The reaction for producing the thermoplastic linear polyurethane for use in the self-bonding magnet wire is carried out in either the presence or absence of a solvent, but the presence of a solvent is preferred to facilitate control of the reaction. A preferred solvent is an organic solvent which does not react with the reactants under the reaction conditions used, or which forms only an addition product wherein the reactants are loosely bonded with the solvent or a compound which will enter into a reaction in a later stage. Particularly preferred solvents are those that dissolve the polymer produced by the reaction. Suitable solvents include hydrocarbons, halogenated hydrocarbons, phenols, esters, ketones, ethers, substituted amides, sulfoxides and sulfones. Specific examples are toluene, xylene, o-dichlorobenzene, phenol, cresylic acid, o-cresol, m-cresol, p-cresol, various kinds of xylenol, acetophenone, benzophenone, ethylene glycol monomethyl ether acetate, N,N-dimethylacetamide, N,N-diethylacetamide, N,N-dimethylformamide, N,N-diethylformamide, N-methyl-2-pyrrolidone, N-acetyl-2-pyrrolidone, N-methyl-caprolactam, dimethyl sulfoxide, dimethyl sulfone, tetramethylene sulfone, hexamethyl phosphoryl amide, formamide, N-methylformamide, γ-butyrolactone and mixtures thereof. Preferred solvents are those consisting essentially of phenols or substituted amides. Solvents consisting essentially of substituted amides are more preferred, and solvents consisting essentially of N,N-dimethylacetamide, N-methyl-2-pyrrolidone, or combinations thereof are most preferred.

The reaction for producing the thermoplastic linear polyurethane for use in this invention is accelerated in the presence of a suitable catalyst. Examples of such catalyst are those which are conventionally used in the reaction with isocyanate, such as boron fluoride, addition products thereof, mineral acid, carboxylic acid, zinc chloride. Also included are tertiary amines such as triethylamine, N-alkylmorpholine, triethylenediamine, 1,8-diaza-bicyclo[5.4.0]undecene-7 (including acid addition products thereof); trialkylphosphine; potassium acetate; zinc octoate; tin dialkyl diacylates such as tin dibutyl dilaurate; alkali metal salts such as lithium linoleate, sodium oleate, sodium methoxide and potassium ethoxide; and heavy metal salts such as cobalt acetate and cobalt naphthenate. Further examples are titanium catalysts illustrated by titanium tetraalkoxides such as titanium tetraisopropoxide, titanium tetrabutoxide and titanium tetraphenolate or chelate compounds thereof, tetralkyl titanium acylate compounds and titanium bis-chelate compounds. Tertiary amines, organic tin compounds and organic titanium compounds are preferred, and titanium catalysts, 1,8-diazabicyclo[5.4.0]undecene-7 (including acid addition products thereof) and tin dibutyl laurate are particularly preferred.

The thermoplastic linear polyurethane to be used in this invention is produced by reacting a glycolic component consisting of (a) polyoxyalkylene glycol alone, or (a) polyoxyalkylene glycol and (b) alkylene glycol, with a diisocyanate component comprising (c) an aromatic diisocyanate.

For providing the self-bonding magnet wire of this invention with good characteristics with respect to mechanical strength, flexibility, and bending properties, it is preferred that the glycolic component should comprise not less than 10 mol% of the polyoxyalkylene glycol (a) and that the diisocyanate component (c) comprises from 90 mol% to 110 mol% based on the moles of the glycolic component. More preferably, the diisocyanate component (c) comprises from 92 mol% to 101 mol% based on the moles of the glycolic component.

Illustrative polyoxyalkylene glycols used to produce the thermoplastic linear polyurethane according to this invention include various poly(ethylene glycol)s such as diethylene glycol, triethylene glycol, and tetraethylene glycol, various poly(propylene glycol)s such as dipropylene glycol, tripropylene glycol and tetrapropylene glycol, dibutylene glycol and tributylene glycol, and these glycols may be used independently or as a mixture. Preferred glycols are those which are represented by the formula $HO[(CH_2)_nO]_mH$, where n is 2 or 3, and m is 2 or 3. More particularly, the preferred glycols are diethylene glycol, triethylene glycol, dipropylene glycol and tripropylene glycol.

Illustrative alkylene glycols used to produce the thermoplastic linear polyurethane according to this invention include ethylene glycol, 1,3-propanediol, 1,4-butanediol, 1,5-pentanediol, 1,6-hexanediol, 1,7-heptanediol, 1,8-octanediol, 1,9-nonanediol, 1,10-decanediol, 1,2-propanediol, 1,2-butanediol, 1,3-butanediol, 2,3-butanediol, 1,4-pentanediol, 2,3-pentanediol, 2,4-pentanediol, 1,5-hexanediol, 2,3-hexanediol, 2,4-hexanediol, 2,5-hexanediol, 3,4-hexanediol, 2-methyl-butanediol-(1,2), 2-methyl-butanediol-(1,3), 2-methyl-butanediol-(1,4), 2-methyl-butanediol-(2,3), 2-methyl-butanediol-(2,4), 2-methyl-butanediol-(3,4), 2,2-dimethyl-propanediol-(1,3), 2-methyl-pentanediol-(2,5), 2-methyl-pentanediol-(2,4), 2-methyl-pentanediol-(1,3), 3-methyl-pentanediol-(2,4), 2,2-dimethyl-butanediol-(1,4), and 2,2-dimethyl-butanediol-(1,3). Preferred alkylene glycols are linear alkylene glycols represented by the formula $HO(CH_2)_lOH$, wherein l is an integer of from 2 to 8. Particularly preferred alkylene glycols are those wherein l is 4 or 6, i.e. 1,4-butanediol or 1,6-hexanediol.

Part of the glycolic component comprising polyoxyalkylene glycol and alkylene glycol may be substituted by tri- or more hydric alcohols, or part of the glycolic component may be substituted by another bifunctional compound capable of reacting with an isocyanate (such as dicarboxylic acid, diamine or aminoalcohol). The extent of the substitution should not be such that it has an adverse effect on the bond strength, its resistance to referigerant and heat.

For the purpose of providing good characteristics for the self-bonding magnet wire of this invention, a particularly preferred glycolic component meets the conditions that when (a) is the number of moles of polyoxyalklyene glycol represented by the formula $HO[(CH_2)_nO]_mH$, and (b) is the number of moles of alkylene glycol represented by the formula $HO(CH_2)_lOH$, the values of n, m, and l are such that the value of $\{(mn+n-1)\times(a)+l\times(b)\}/\{(a)+(b)\}$ is in the range of from 4.0 to 8.5. If the value is less than 4.0, high temperature may be necessary for bonding, and if the value is greater than 8.5, the bond strength may drop at elevated temperatures. A particularly preferred range of said value is from 4.0 to 7.5.

Illustrative aromatic diisocyanates used to produce the thermoplastic linear polyurethane according to this invention include p-xylylene diisocyanate, m-xylylene diisocyanate, m-phenylene diisocyanate, p-phenylene diisocyanate, 2,4-tolylene diisocyanate, 2,6-tolylene diisocyanate, 4,4'-biphenyl diisocyanate, 4,4'-diphenylpropane diisocyanate, 4,4'-diphenylmethane diisocyanate, 3,3'-dimethyl-4,4'-diphenylmethane diisocyanate, 3,3'-cyclobiphenyl diisocyanate, 4,4'-diphenylsulfide diisocyanate, 3,3'-diphenylsulfone diisocyanate, 4,4'-diphenylsulfone diisocyanate, 4,4'-diphenylether diisocyanate, 1,5-naphthalene diisocyanate, 3,3'-dimethyl-4,4'-bisphenyl diisocyanate, 3,3'-dimethoxybiphenyl diisocyanate and 1-isopropyl-2,4-metaphenylene diisocyanate. These isocyanates may be stabilized by masking the isocyanate group(s) with phenols such as phenol, cresol and xylenol; alcohols such as methyl alcohol, ethyl alcohol and isopropyl alcohol; cellosolves such as methyl cellosolve and ethyl cellosolve; and lactams such as pyrrolidone, ε-caprolactam and ω-laurolactam. For providing maximum heat resistance for the self-bonding magnet wire of this invention, preferred diisocyanates are those which are represented by the formula: OCN-R-NCO (wherein R is

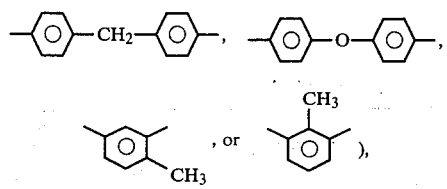

namely, 4,4'-diphenylmethane diisocyanate, 4,4'-diphenylether diisocyanate, 2,4-tolylene diisocyanate, and 2,6-tolylene diisocyanate. These diisocyanates may be stabilized by masking the isocyanate group(s) with the compounds mentioned above. Another reason for selecting these diisocyanates is their inexpensiveness. A particularly preferred diisocyanate is 4,4'-diphenylmethane diisocyanate.

It is to be understood that a very small part of these diisocyanates may be substituted by polyisocyanates provided that the polyisocyanates do not adversely affect the desired characteristics of the self-bonding magnet wire of this invention. However, the degree of substitution should desirably be kept to a minimum, because excessive substitution is detrimental to the bond strength and the flexibility of the resulting self-bonding magnet wire, no matter how small the excess is.

The glycolic component and aromatic diisocyanate described above are reacted with each other to prepare the thermoplastic linear polyurethane which preferably has a reduced specific viscosity of greater than 0.3 dl/g, for an amount of 0.5 g of the resin in 100 ml of N,N-dimethylacetamide at 30° C. If the reduced specific viscosity is less than 0.3 dl/g, the wetting characteristics of the resin are decreased to such an extent that no coating is formed or the resulting electric wire has poor appearance. Preferably, the aromatic diisocyanate is reacted with an equivalent or excess of the glycolic component.

This invention is now described in greater detail by reference to the following examples and comparative examples, which are given here for illustrative purposes only and are not intended to limit the scope of the invention. In the examples, the reduced specific viscosity of all polymers was measured using an amount of 0.5 g of the polymer in 100 ml of N,N-dimethyl acetamide at 30° C. Baking of polymer solution coated wires was carried out using a vertical furnace at a furnace temperature of 360° C. at the upper portion, 320° C. in the middle and 260° C. at the lower portion thereof at a supply speed of 15 m/min.

EXAMPLE 1

A mixture of 30.0 g (0.20 mol) of triethylene glycol, 94.6 g (0.80 mol) of 1,6-hexanediol, 250.3 g (1.00 mol) of diphenylmethane-4,4'-diisocyanate and 562.4 g of N-methyl-2-pyrrolidone was stirred in a reaction vessel until the reaction mixture become hot (ca. 80° C.) and viscous due to the heat of reaction. Then, the reaction system was placed in an oil bath to elevate its temperature to 120° C. over a period of one hour, and it was held at that temperature for two hours until the reaction was completed. To the reaction mixture, 137.4 g of N-methyl-2-pyrrolidone and 175.0 g of xylol were added, and the mixture was diluted to provide a transparent polymer solution. The polymer produced had a reduced specific viscosity of 0.73. The polymer solution was applied to an electric wire comprising a conductor of 1.0 mm in diameter insulated with polyesterimide overcoated with polyamideimide (insulation coating of 0.035 mm in thickness), and baked to provide a self-bonding magnet wire having a bonding layer of 0.013 mm in thickness.

EXAMPLES 2 to 11

Thermoplastic linear polyurethane compositions were prepared by reacting the compounds (a), (b) and (c) in amounts as indicated in Table 1 below. The reduced specific viscosities of the polymers are also indicated in Table 1. The solutions of the polymers were applied to insulated electric wire comprising a conductor of 1.0 mm in diameter coated with an insulator of 0.035 mm in thickness (the type of the insulation coatings used are shown in Table 2 below), and baked to provide self-bonding magnet wires having a bonding layer of 0.013 mm in thickness.

COMPARATIVE EXAMPLE 1

A phenoxy resin (125 g) available from Union Carbide under the trade name "PKHH" was dissolved in a mixture of 225 g of m-cresol and 150 g of xylene at 120° C. to provide a uniform transparent solution. The solution was applied to the same type of electric wire as was used in Example 1, and a self-bonding magnet wire was produced.

COMPARATIVE EXAMPLE 2

A polysulfone resin (125 g) available from Union Carbide under the trade name "P-1700" was dissolved in 375 g of m-cresol at 120° C. to provide a uniform transparent solution. The solution was applied to an electric wire the same as what was used in Example 1, and a self-bonding magnet wire was produced.

The characteristics of the self-bonding magnet wires produced in Examples 1 to 11 and Comparative Examples 1 and 2 are set forth in Table 2. The values in the column of "bond strength after refrigerant conditioning of Table 2 were obtained as follows: an electric wire was closely wound around a mandrel (6.5 mm in diameter) into a helical coil 70 mm long which was heated at 160° C. for one hour (the wire of Comparative Example 2 was heated at 230° C. for one hour) and immersed in Freon ® R-22 (85° C., 42 kg/cm²) in an autoclave for 96 hours, and the bond strength was determined according to ASTM D-2519. The values in the column headed "Percent Refrigerant Extraction" were obtained according to NEMA MW-1000 by measuring the percent George, U.S.A. was immersion-impregnated in an electric wire comprising a conductor of 1.0 mm in diameter insulated with polyesterimide overcoated with polyamideimide, and the wire was dried with air and heat-cured at 150° C. for 5 hours. The bond strength after refrigerant conditioning and percent refrigerant extraction of the example were measured and the results are also indicated in Table 2.

TABLE 1

|     |     | Example 1 | Example 2 | Example 3 | Example 4 | Example 5 | Example 6 | Example 7 | Example 8 | Example 9 | Example 10 | Example 11 |
|-----|-----|-----------|-----------|-----------|-----------|-----------|-----------|-----------|-----------|-----------|------------|------------|
| (a) | DEG [mol] |  | 0.90 |  |  |  |  |  |  | 2.00 |  |  |
|     | TEG [mol] | 0.20 |  |  | 0.80 |  | 0.75 | 0.75 | 0.40 |  | 1.60 | 1.00 |
|     | DPG [mol] |  |  | 0.40 |  | 0.40 |  |  |  |  |  |  |
| (b) | E G [mol] |  |  |  |  |  |  |  | 0.75 |  |  |  |
|     | 1,4 - BD [mol] |  | 0.60 | 0.60 | 1.20 |  |  |  | 1.60 |  |  |  |
|     | 1,6 - HD [mol] | 0.80 |  |  |  | 1.60 | 0.75 |  |  |  | 0.40 |  |
| (c) | MDI [mol] | 1.00 | 1.44 | 0.97 | 1.96 | 2.02 | 1.50 | 1.47 | 1.90 | 1.96 | 1.96 | 0.98 |
| (c) / {(a) + (b)} | | 1.00 | 0.96 | 0.97 | 0.98 | 1.01 | 1.00 | 0.98 | 0.95 | 0.98 | 0.98 | 0.98 |
| (a) / {(a) + (b)} | | 0.2 | 0.6 | 0.4 | 0.4 | 0.2 | 0.5 | 0.5 | 0.2 | 1.0 | 0.8 | 1.0 |
| (mn + m − 1) × (a) + 1 × (b) / (a) + (b) | | 6.4 | 4.6 | 5.2 | 5.6 | 6.2 | 7.0 | 6.0 | 4.8 | 5.0 | 7.6 | 8.0 |
| Reduced specific viscosity of product polymer [dl/g] | | 0.73 | 0.42 | 0.46 | 0.53 | 0.86 | 0.71 | 0.51 | 0.36 | 0.55 | 0.57 | 0.58 |

DEG : diethylene glycol HO—(CH$_2$)$_2$—O)$_2$—H,
EG : HO—(CH$_2$)$_2$—OH
TEG : triethylene glycol HO—(CH$_2$)$_2$—O)$_3$—H,
1,4-BD : HO—(CH$_2$)$_4$—OH
DPG : dipropylene glycol HO—(CH$_2$)$_3$—O)$_2$—H,
1,6-HD : HO—(CH$_2$)$_6$—OH
MDI : diphenylmethane-4,4'-diisocyanate

TABLE 2

| Example No. | Type of Insulation Coating | Bond Strength after Refrigerant Conditioning[kg] | | | | Percent Refrigerant Extraction | Appearance of Coating after Refrigerant Conditioning |
|---|---|---|---|---|---|---|---|
| | | Room Temp. | 80° C. | 100° C. | 120° C. | | |
| Example 1 | EI/AI | 16.5 | 8.5 | 5.6 | 3.1 | 0.02 | Good |
| Example 2 | " | 10.6 |  | 6.5 | 2.0 | 0.03 | " |
| Example 3 | " | 17.8 |  | 9.7 | 3.8 | 0.04 | " |
| Example 4 | A I | 12.6 | 8.3 | 5.2 | 2.3 | 0.04 | " |
| Example 5 | " | 17.4 |  | 6.8 | 1.8 | 0.08 | " |
| Example 6 | " | 23.7 | 5.5 | 2.7 | 1.1 | 0.07 | " |
| Example 7 | " | 14.9 |  | 4.5 | 1.4 | 0.05 | " |
| Example 8 | " | 10.4 |  | 4.3 | 1.9 | 0.03 | " |
| Example 9 | " | 15.7 |  | 5.9 | 1.6 | 0.02 | " |
| Example 10 | EI/AI | 17.9 | 9.3 | 1.8 |  | 0.20 | " |
| Example 11 | " | 17.6 | 8.2 | 1.6 |  | 0.16 | " |
| Comparative Example 1 | " | 22.3 | 0.6 | 0.2 |  | 0.91 | Discoloration and blistering appreciable |
| Comparative Example 2 | " | 16.8 |  | 3.4 | 1.6 | 1.20 | Discoloration and blistering appreciable |
| Comparative Example 3 | " | 26.1 | 2.9 | 2.1 | 1.3 | 0.11 | |

EI/AI : polyesterimide overcoated with polyamideimide
A I : polyamideimide extraction with Freon ® R-22 of a sample heated at 160° C. for one hour (the sample of Comparative Example 2 was heated at 230° C. for one hour). We also heated the wires at 160° C. for one hour (the sample of Comparative Example 2 was heated at 230° C. for one hour), immersed them in Freon ® R-22 (85° C., 42 kg/cm²) for 96 hours, heated them at 120° C. for 10 minutes, and examined for any discoloration or blistering that occurred in the coating of the wires. The results are also indicated in Table 2.

COMPARATIVE EXAMPLE 3

As an example of the conventional refrigerant-adapted impregnant varnish, Pedigree-923 of P. D.

While the invention has been described in detail and with reference to specific embodiments thereof, it will be apparent to one skilled in the art that various changes and modifications can be made therein without departing from the spirit and scope thereof.

What is claimed is:

1. A self-bonding magnet wire, comprising:
an insulated conductor; and
a coating over said insulated conductor of an enamel composition consisting essentially of a thermoplastic linear polyurethane prepared by reacting a glycolic component comprising (a) polyoxyalkylene glycol, (b) alkylene glycol, and (c) aromatic diisocyanate, and baking the coated insulated conductor, wherein the molar ratio of components (a), (b) and (c) is such that $0.92 \leq (c)/\{(a)+(b)\} \leq 1.01$, and $0.1 \leq (a)/\{(a)+(b)\} \leq 1.0$, wherein (a) is the number of moles of polyoxyalkylene glycol represented by the formula $HO\text{-}(CH_2)_n O\text{-}_m H$ and (b) is the number of moles of alkylene glycol represented by the formula $HO\text{-}(CH_2)_l OH$, and the values of n, m, and l are such that the value of the equation $\{(mn+m-1)\times(a)+l\times(b)\}/\{(a)+(b)\}$ is in the range of from 4.0 to 8.5.

2. A self-bonding magnet wire according to claim 1 wherein the value of $$\{(mn+m-1)\times(a)+l\times(b)\}/\{(a)+(b)\}$$

in the range of from 4.0 to 7.5.

3. A self-bonding magnet wire according to claim 1 wherein the polyoxyalkylene glycol is represented by the formula

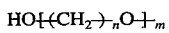

wherein n is 2 or 3, and m is 2 or 3.

4. A self-bonding magnet wire according to claim 1 wherein the polyoxyalkylene glycol is diethylene glycol.

5. A self-bonding magnet wire according to claim 1 wherein the polyoxyalkylene glycol is triethylene glycol.

6. A self-bonding magnet wire according to claim 1 wherein the polyoxyalkylene glycol is dipropylene glycol.

7. A self-bonding magnet wire according to claim 1 wherein the alkylene glycol is represented by the formula

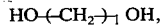

wherein l is an integer of 2 to 8.

8. A self-bonding magnet wire according to claim 1 wherein the alkylene glycol is 1,6-hexanediol.

9. A self-bonding magnet wire according to claim 1 wherein the alkylene glycol is 1,4-butanediol.

10. A self-bonding magnet wire according to claim 1 wherein the aromatic diisocyanate is 4,4'-diphenylmethane diisocyanate.

11. A self-bonding magnet wire according to claim 1 wherein the thermoplastic linear polyurethane has a reduced specific viscosity not less than 0.3 dl/g for an amount of 0.5 g of the resin in 100 ml of N,N-dimethylacetamide at 30° C.

12. A self-bonding magnet wire according to claim 1 wherein the insulator of the insulated conductor is of the type used in a hermetic motor.

13. A self-bonding magnet wire according to claim 1 wherein the insulator of the insulated conductor is a polyamideimide.

14. A self-bonding magnet wire according to claim 1 wherein the insulator of the insulated conductor is a polyesterimide overcoated with polyamideimide.

15. A self-bonding magnet wire according to claim 1 or 4 wherein the polyoxyalkylene glycol is represented by the formula

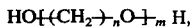

wherein n is 2 or 3, and is 2 or 3.

16. A self-bonding magnet wire according to claim 1 or 4 wherein the polyoxyalkylene glycol is diethylene glycol.

17. A self-bonding magnet wire according to claim 1 or 4 wherein the polyoxyalkylene glycol is triethylene glycol.

18. A self-bonding magnet wire according to claim 1 or 4, wherein the polyoxyalkylene glycol is dipropylene glycol.

19. A self-bonding magnet wire according to claim 1 or 4 wherein the alkylene glycol is represented by the formula

wherein l is an integer of from 2 to 8.

20. A self-bonding magnet wire according to claim 1 or 4, wherein the alkylene glycol is 1,6-hexanediol.

21. A self-bonding magnet wire according to claim 1 or 4, wherein the alkylene glycol is 1,4-butanediol.

22. A self-bonding magnet wire according to claim 12 wherein the insulator of the insulated conductor is selected from the group consisting of polyamideimide, poly(vinyl formal), polyesterimide overcoated with polyamideimide, polyamideimide overcoated with polyesterimide, polyimide overcoated with poly(vinyl formal) and polyesteramideimide.

* * * * *